Figure 4:
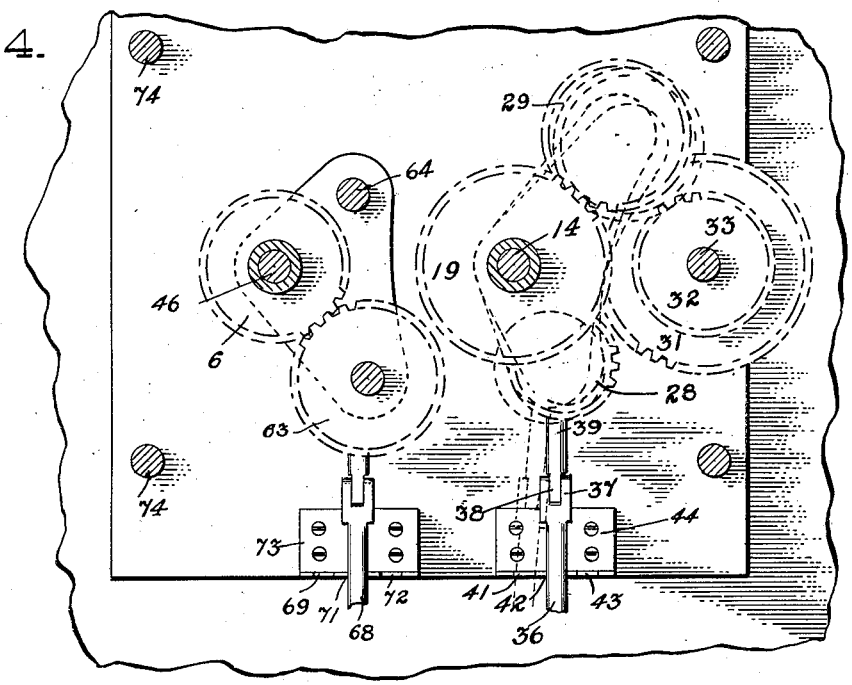

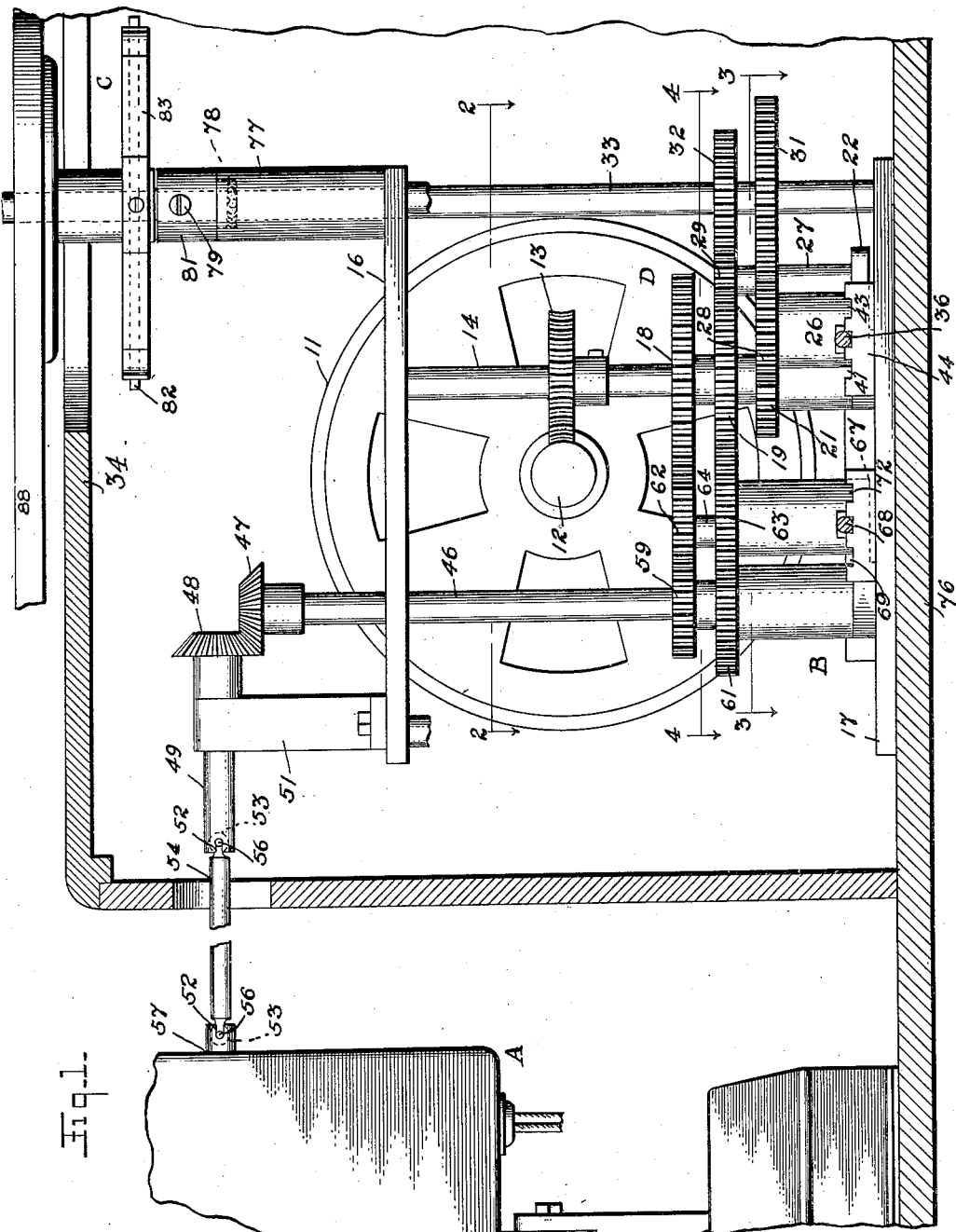

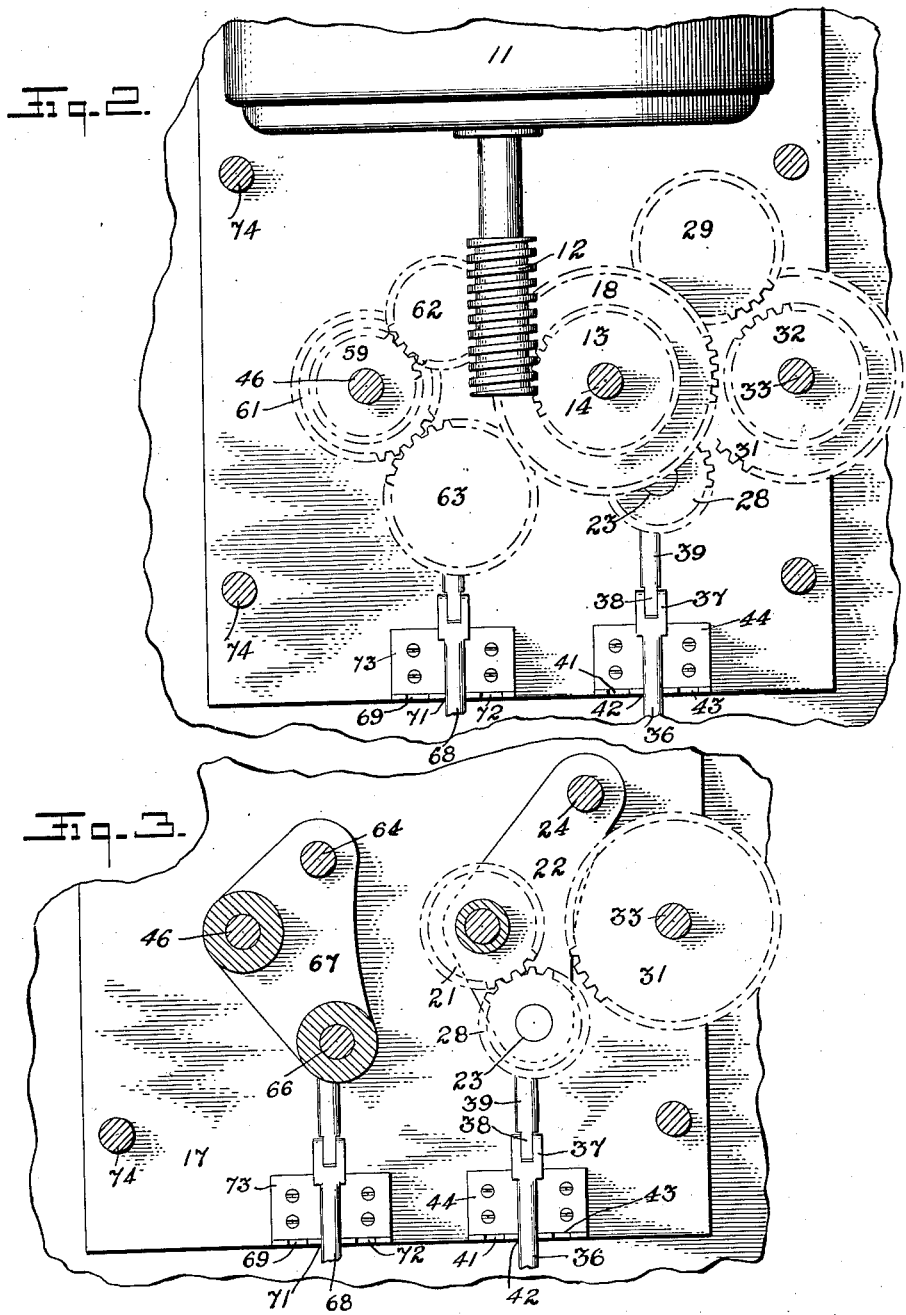

Aug. 2, 1932. J. E. COHEN ET AL 1,869,882
COMBINED MOTION PICTURE PROJECTOR AND SOUND REPRODUCING MACHINE
Filed Sept. 9, 1930 5 Sheets-Sheet 3

WITNESS:

INVENTORS
Joseph Ellis Cohen, Humbert Godoy
Rudolph Miehling
BY
THEIR ATTORNEY

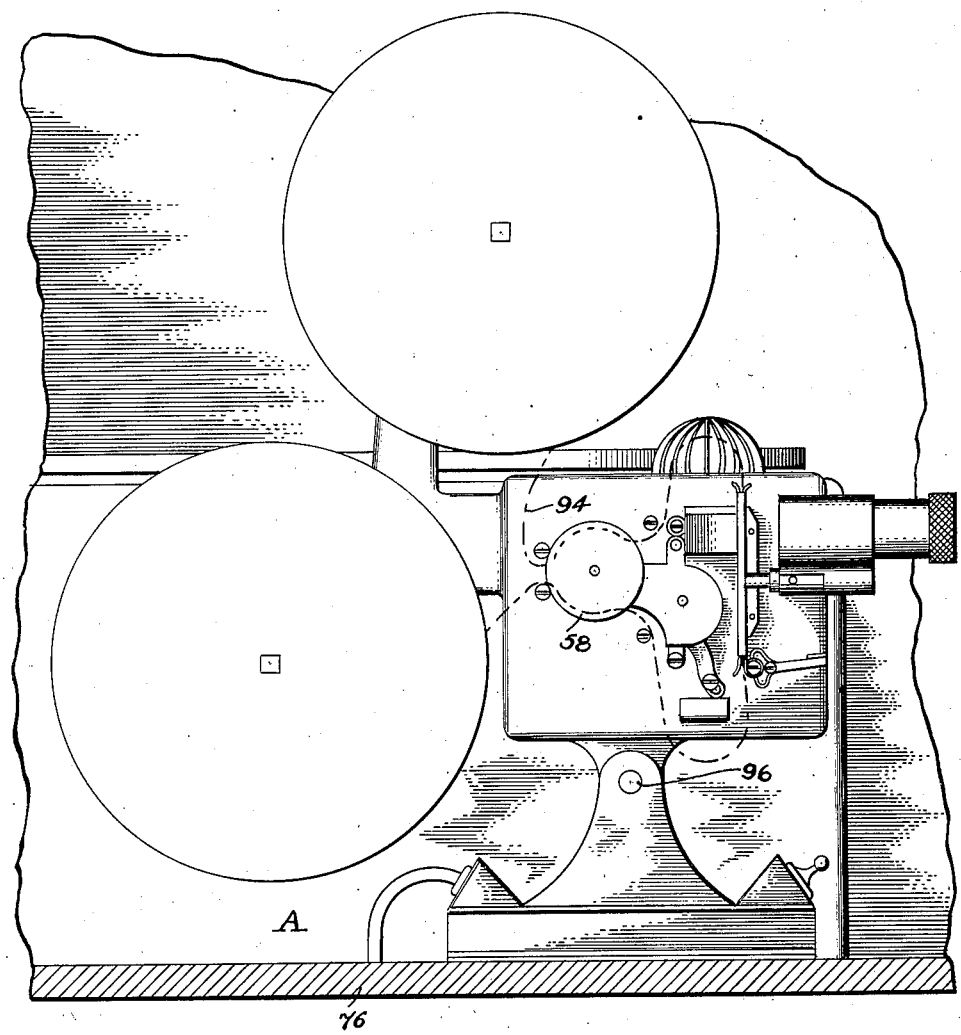

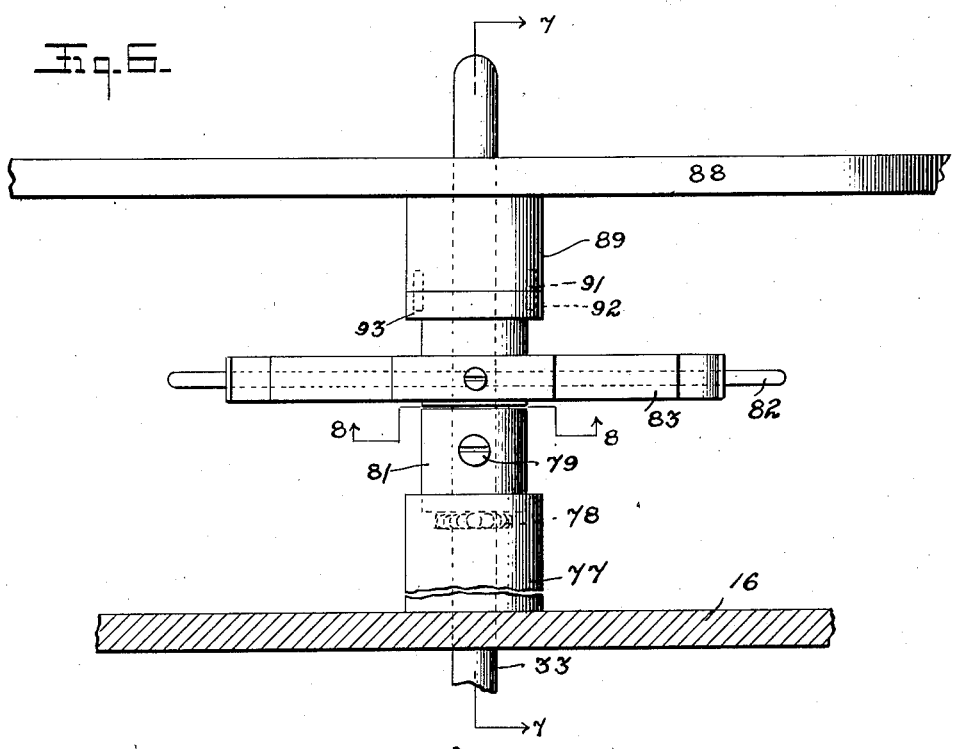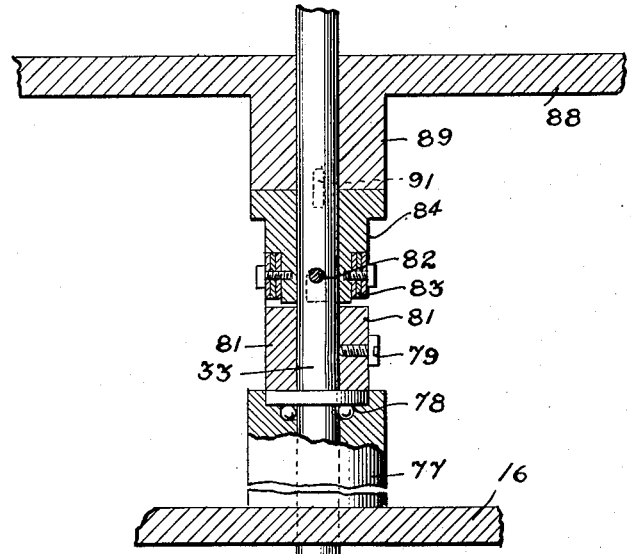

Patented Aug. 2, 1932

1,869,882

UNITED STATES PATENT OFFICE

JOSEPH ELLIS COHEN AND HUMBERT GODOY, OF PHILADELPHIA, PENNSYLVANIA, AND RUDOLPH MIEHLING, OF NEW YORK, N. Y., ASSIGNORS TO SENTRY SAFETY CONTROL CORPORATION, OF PHILADELPHIA, PENNSYLVANIA, A CORPORATION OF DELAWARE

COMBINED MOTION PICTURE PROJECTOR AND SOUND REPRODUCING MACHINE

Application filed September 9, 1930. Serial No. 480,704.

This invention relates to a combined motion picture projector and sound reproducing machine, and has particular reference to the control of speeds, whereby the machines are synchronized in a simple and efficient manner.

The ordinary talking machine disc records are made in ten and twelve inch sizes, but there has for sometime been produced a professional record, which is sixteen inches in diameter.

Ordinary twelve inch records consume approximately four minutes in reproducing the sound thereon, while professional records require about fifteen minutes to produce the impressions therefrom.

The sound on the ten and twelve inch records is produced at a speed of 80 R. P. M., while the sound on the sixteen inch professional record is produced at a speed of 33⅓ R. P. M.

Films are being manufactured for synchronization with both types of records, so that at this day it becomes essential that a combined motion picture and talking machine must have the facilities for reproducing the motion and sound from these different types of films and records.

Furthermore, in order to produce such a universal machine for use in the home and among unskilled, it must be provided with simple operating means, whereby the changes in speed relation may be accomplished without any adjusting or calculations.

The object of the present invention is to produce a combined motion picture and talking machine in which there is incorporated devices which may be simply operated for changing the speeds of the motion picture film and sound reproducing disc, in order to synchronize the same.

A further object of the invention is to provide positive driving mechanism between the two machines which permits the free focusing of the picture machine without the adjustment of any parts or mechanism.

A still further object of the invention is to provide means easily accessible to the unskilled for operating the talking machine and the picture projecting machine at synchronized speeds, for changing these speeds to other synchronous speeds, or for operating either of the machines while the other remains at rest.

According to the invention, the talking machine and projecting machine are driven by a common motor and through simple gear shifting mechanism, in which the ratio of the gears is readily changed by means of small levers easily accessible. The motion picture machine is operated by this gear mechanism through a universal shaft, which permits focusing of the machine without the adjustment of parts.

Figure 5:
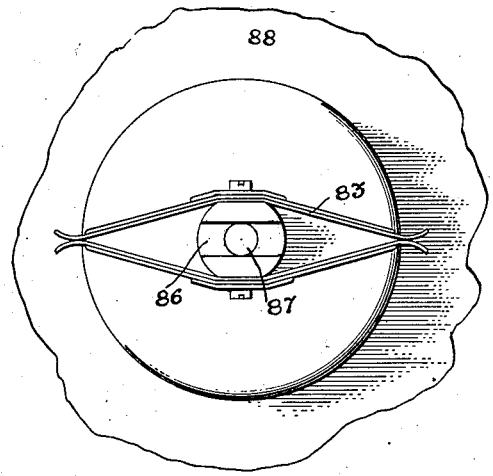

The drawings illustrate an embodiment of the invention and the views therein are as follows:

Figure 1 is a fragmentary view of the projector and talking machine, partly broken away, and shows the gears for changing the speeds of the two machines and the universal shaft drive of the projector, Figure 2 is a longitudinal sectional view on the line 2—2 of Figure 1, Figure 3 is a like view on the line 3—3 of Figure 1, Figure 4 is a like view on the line 4—4 of Figure 1, Figure 5 is a side view of the projector, Figure 6 is an enlarged detail view showing the manner in which the disc plate is mounted for operation, Figure 7 is a vertical sectional view of the same, on the line 7—7 of Figure 6, and Figure 8 is a bottom plan view, looking in the direction of the arrows 8—8 on Figure 6 and with the parts removed from the operating shaft.

The apparatus shown in Figure 1 is, of course, mounted in a suitable casing (not shown) and the sound from the disc may be amplified and the amplifiers located adjacent the screen or at suitable points, depending upon the acoustics in the particular display room.

The mechanism consists of the motion picture projector A and its driving mechanism B, the talking machine C and its driving mechanism D.

The machines are driven by a motor 11 whose shaft is provided with a worm 12, which meshes with a worm gear 13 on a vertical shaft 14 housed between the intermediate support 16 and the base 17.

The shaft 14 is provided with gears 18, 19 and 21, firmly secured to said shaft and whose vertical positions are assured by means of collars between said gears.

Resting on the base 17 and pivotally mounted on the shaft 14 is a cam plate 22, and this plate is provided with suitable shafts 23 and 24 securely mounted therein, while the shafts are provided with collars 26 and 27 which at their upper ends are, respectively, provided gears 28 and 29.

The former of these gears meshes at all times with the gear 21 on the shaft 14, while the latter gear 29 meshes at all times with the gear 19 on said shaft.

In vertical alignment with the gears 28 and 29, the former of which is lower than the latter, there are gears 31 and 32, respectively, mounted on the talking machine shaft 33, which extends from the base 17, through the intermediate support 16 and above the cover 34, which houses the gear mechanism and the motor.

The cam plate 22 being freely movable on the shaft 14, the gear 28 may be meshed with the gear 31 or the gear 29 may be meshed with the gear 32, by moving the lever 36 either to the right or left, and which operation can be readily understood by a glance at Figure 3 or Figure 4.

The lever 36 is bifurcated at 37 to receive the reduced end 38 of a short lever 39 secured to the cam plate 22, so that the lever 36 may be raised or lowered, as desired, and moved and dropped into either of the grooves 41, 42 or 43 in the retaining plate 44.

When the lever 36 is in the groove 42, neither of the gears 28 or 29 will be in mesh with the gears 31 and 32, so that the talking machine shaft 33 will remain at rest.

The gears heretofore described, with the exception of the gear 18, are confined entirely to the operation of the talking machine. The picture projector gears are as follows:

A shaft 46 has its lower end mounted in the base 17 and extends through the intermediate support 16 and is provided on its upper end with a bevel gear 47. That bevel gear meshes with a bevel gear 48 on a stub shaft 49 mounted in a support 51 secured to the upper face of the intermediate support 16.

The outer end of the stub shaft 49 is provided with a socket and with diametrical slots 52 for receiving the ball end 53 of a universal shaft 54. Extending through the ball 53 is a pin 56 which fits into the slots 52.

This shaft 54 is provided on its other end with a ball 53 as just described, and the end of the projector driving shaft 57 is likewise provided with a socket and with a slot 52, as is the end of the shaft 49.

The shaft 57 drives the sprocket 58 of the motion picture projector and said sprocket is shown in Figure 5.

The shaft 46 is provided with spaced gears 59 and 61 and these gears mesh, respectively, with gears 62 and 63 mounted on the shafts 64 and 66, respectively, which said shafts are securely mounted in the cam plate 67.

The cam plate 67 is pivotally mounted on the shaft 46 and has an operating lever 68 connected thereto in like manner as the operating lever 36 is connected to the cam plate 22, and this operating lever 68 is adapted to rest in one or the other of the grooves 69, 71 or 72, in the retaining plate 73.

Depending upon the position of the cam plate 67, the gears 62 and 63 are alternately meshed with the gears 18 and 19 on the shaft 14, so that the speed of the shaft 46 is altered by changing the position of the operating lever 68 from the groove 69 to the groove 72.

When the said operating lever 68 is in the groove 71, neither of the gears 62 or 63 are in mesh with the gears 18 and 19, so that the shaft 46 is stationary. This is the condition in which these gears are maintained when it is desired to use the talking machine only and with the projector out of use.

The intermediate plate 16 is supported in position by means of a plurality of studs 74 extending up from the base 17, while said base is supported on the bottom 76 of the cabinet (not shown).

The talking machine shaft 33 extends up through a collar 77 which is provided at its upper end with a thrust bearing 78. On this thrust bearing, and firmly secured to the said shaft through the set screw 79 is a collar 81. A short distance above the top of the collar 81 there is extended through the shaft 33 a pin 82 which fits between the ends of leaf springs 83 secured at their centers on a bushing 84.

The bottom of this bushing 84 has a recess 86 extending across the diameter of the same and through the hole 87 through which the shaft 33 extends. The pin 82 bears against the bottom of this recess and the bushing 84 is, therefore, movable on the shaft to the extent in which the pin 82 may move in the recess 86, and depending upon the forces on said shaft overcoming the resistance of the leaf springs 83. With this arrangement any irregularities of the motor are absorbed without being communicated to the disc record.

In order that the disc plate 88 may be removed from the shaft 33 with facility, in order to allow access to the gear mechanisms or to remove the cover 34, the lower face of said plate 88 is provided with a sleeve 89 having one or two pins 91 extending from the bottom thereof, and which said pins are adapted to fit into complementary holes 92 on the flange 93 on the upper end of the collar 81.

Figure 4 shows the positions of the levers 36 and 68 when both gears trains are in neutral position, so that the operation of the motor would operate neither the picture projector, nor the talking machine, and that figure also shows the lever 36 in dotted line position and in the groove 41, and when the gear 29 is meshing with the gear 32 on the talking machine shaft 33 so that the disc plate 88 of the talking machine is being rotated at its high speed.

When the lever 36 is moved across the slot 42 and dropped into the slot 42, the gear 28 will mesh with the gear 31 and the talking machine shaft 33 will be rotated at its slow speed. It is at this speed that the professional records are rotated.

The gears on the shafts 64 and 66 on the cam plate 67 are also operated in like manner by means of the lever 68, so that the speed of the film 94 in the picture projector A is increased or decreased, according to the film which is being operated therein, and as these films are made to be operated with either the usual or professional records, the speed will depend entirely upon the record which is being operated on the talking machine.

Of course, it will be understood that the picture projector may be used independently of the talking machine and in such case the speed of the projector will depend entirely upon the kind of film being projected thereby.

In designing this machine, it has been the desire of the inventors to provide a universal machine and the projector is, of course, the type which projects sixteen millimeter films, as distinguished from the standard thirty-five millimeter films projected by the large display machines operated in theatres, etc.

The machine, as shown and described, will, therefore, serve the purposes of a talking machine, a projecting machine and a combined projecting and talking machine which has all the efficacy of a machine adapted to reproduce sound from films and which said machines are of such a nature that they would be unadapted for operation by unskilled persons.

Great care has been taken in providing the ratio between the respective gears, so that complete synchronism prevails throughout the entire range and as both record and film are marked with the starting point, the levers 36 and 68 being set at the proper position, the motor may be switched on and the attendant assured of complete synchronism throughout the entire record and film.

The universal connection between the gear driving mechanism for the picture projector and the sprocket which advances the film 94 therein permits the projector to be adjusted at its pivotal point 96, without the necessity of adjusting any mechanism, as the sockets on the ends of the shafts 49 and 57 are sufficiently deep to provide for the widest range of focal adjustment.

Of course, the combined picture projector and talking machine herein illustrated may be modified in various ways and the ratios of the gear mechanisms and the mounting thereof changed in many ways without departing from the invention herein set forth and hereafter claimed.

The invention is hereby claimed as follows:

1. Mechanism for selectively controlling the speeds of motor operated combined motion picture and talking machines, comprising a main shaft driven by the motor, gears on said shaft, a cam plate pivotally mounted on said shaft, gears on said plate meshing with gears on said shaft, a talking machine shaft having gears meshed selectively by the gears on said cam plate, a motion picture shaft having gears thereon, a cam plate pivotally mounted on said last shaft, and gears on said last cam plate meshing with the gears on said last shaft and adapted to be selectively meshed with gears on said main shaft.

2. Mechanism such as described in claim 1, combined with universal means operated by the motion picture shaft, whereby the said machine may be focused as desired.

In testimony whereof we have signed our names to this specification.

JOSEPH ELLIS COHEN.
HUMBERT GODOY.
RUDOLPH MIEHLING.